United States Patent [19]

Horikawa et al.

[11] Patent Number: 4,498,006
[45] Date of Patent: Feb. 5, 1985

[54] RADIATION IMAGE READ-OUT METHOD AND APPARATUS

[75] Inventors: Kazuo Horikawa; Satoshi Arakawa, both of Kanagawa, Japan

[73] Assignee: Fuji Photo Film Co., Ltd., Kanagawa, Japan

[21] Appl. No.: 441,984

[22] Filed: Nov. 15, 1982

[30] Foreign Application Priority Data

Nov. 13, 1981 [JP] Japan .................................. 56-181831

[51] Int. Cl.³ ................................................ G03C 5/16
[52] U.S. Cl. ................................ 250/327.2; 250/484.1
[58] Field of Search ................... 250/327.2, 484.1, 337; 364/414

[56] References Cited

U.S. PATENT DOCUMENTS 4,284,889 8/1981 Kato et al. ......................... 250/354.1

Primary Examiner—Janice A. Howell
Assistant Examiner—Carolyn E. Fields
Attorney, Agent, or Firm—Sughrue, Mion, Zinn, Macpeak & Seas

[57] ABSTRACT

In a radiation image read-out system in which a stimulable phosphor sheet carrying a radiation image stored thereon is exposed to stimulating rays which causes it to emit light in the pattern of the stored image, and the emitted light is photoelectrically read out, the interval between the radiation image recording on the stimulable phosphor sheet and preliminary read-out is measured, the image input information detected by the preliminary read-out is corrected according to the interval measured, and the final read-out conditions and/or the image processing conditions are set based on the corrected image input information. To determine the interval, a bar code label for identifying the phosphor sheet is attached thereto, and the time when the recording thereon is conducted is stored in a memory with respect to the bar code label. Or, a magnetic recording medium is attached to the phosphor sheet, and the recording time is recorded on the medium and read out therefrom at the time of preliminary read-out.

7 Claims, 3 Drawing Figures

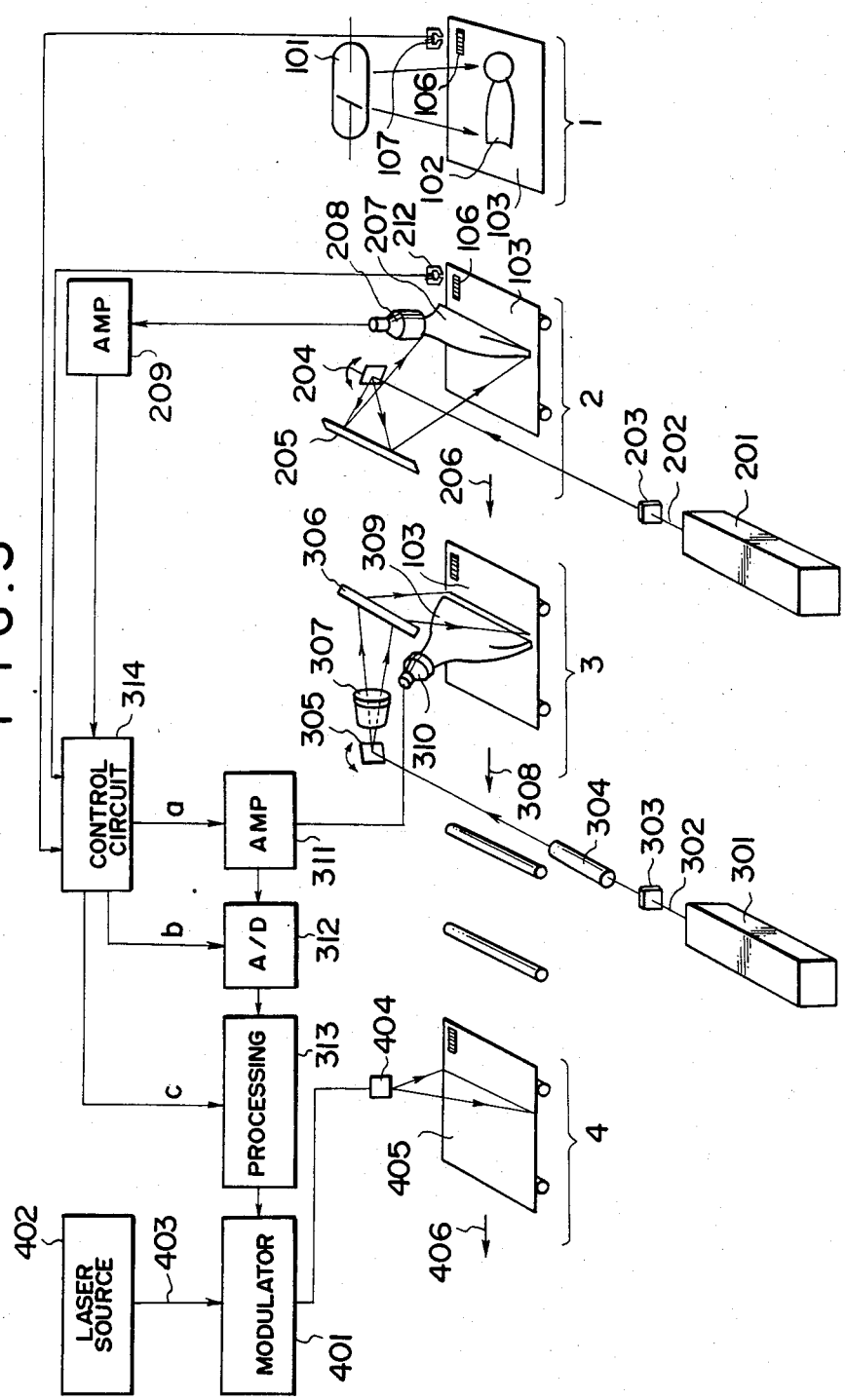

RADIATION IMAGE READ-OUT METHOD AND APPARATUS

BACKGROUND OF THE INVENTION

1. Field of the Invention

This invention relates to a radiation image readout method in which a stimulable phosphor sheet carrying a radiation image stored therein is exposed to a stimulating rays which causes it to emit light in the pattern of the stored image, and the emitted light is photoelectrically read out by a photodetector, and an apparatus for carrying out the method.

2. Description of the Prior Art

When certain kinds of phosphors are exposed to such radiation as X-rays, α-rays, β-rays, γ-rays or ultraviolet rays, they store a part of the energy of the radiation. Then, when the phosphor which has been exposed to the radiation is exposed to stimulating rays such as visible rays, light is emitted from the phosphor in the pattern of the stored energy of the radiation. A phosphor exhibiting such properties is referred to as a stimulable phosphor.

As disclosed in U.S. Pat. No. 4,258,264 and Japanese Unexamined patent publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with a stimulating ray such as laser beam which causes it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic light-sensitive material or on a display such as cathode rays tube (CRT).

This radiation image system using the stimulable phosphor sheet is advantageous over the conventional radiography using a silver halide photographic material in that the image can be recorded over a very wide range of radiation exposure and further in that the electric signal used for reproducing the visible image can be freely processed to improve the image quality for viewing, particularly diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing and diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation does due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

However, in order to eliminate various influences based on the fluctuation of radiographic exposure conditions and/or obtain a radiation image having a high image quality or a high diagnostic efficiency and accuracy, it is necessary to investigate the image input condition of the radiation image stored on the stimulable phosphor sheet such as high radiation dose recording or the image input pattern, which is determined by the radiographic method such as portion image (e.g. chest and abdomen), plain image or contrasted image radiographing, before reproducing the radiation image to a visible image, and appropriately adjust the read-out gain or appropriately process the electric signal based on the investigated image input condition or the image input pattern. The image input condition and the image input pattern will hereinafter be simply referred to as the image input information when they should be expressed generically. It is also necessary to determine the scale factor to optimize the resolution according to the contrast of the image input pattern.

The investigation of the image input information may be conducted prior to the visible image reproduction by use of the method disclosed in U.S. Pat. No. 4,284,889, which is based on the finding that the amount of light instantaneously emitted from the stimulable phosphor sheet upon exposure thereof to a radiation is proportional to the amount of the radiation energy stored in the stimulable phosphor. In this method, image input information is investigated by detecting the instantaneously emitted light, and an appropriate signal processing is conducted based on the image input information in order to obtain a visible radiation image having an improved image guality, particularly a high diagnostic efficiency and accuracy. With this method, since it is possible to appropriately adjust the read-out gain, select an appropriate scale factor, or conduct an appropriate signal processing, a radiation image suitable for viewing and diagnostic purposes can be obtained regardless of fluctuation of the radiographic exposure conditions. However, since the recording of radiation image to the stimulable phosphor sheet and read out of the recorded image from the stimulable phosphor sheet are usually performed at different location, a signal transfer system must be formed therebetween, necessitating a complicated apparatus and a high cost.

Further, U.S. Pat. No. 4,276,473 discloses a method of estimating the image input condition or image input pattern of a radiation image stored in the stimulable phosphor by positioning a non-stimulable phosphor in the vicinity of the stimulable phosphor sheet, and detecting the light emitted from the non-stimulable phosphor upon exposure thereof to a radiation by use of a photodetector. However, this method also has the same drawback as that of the method disclosed in aforesaid U.S. Pat. No. 4,284,889. Further, since the stimulable phosphor itself for recording the radiation image is not used as the detecting means for the image input information and it is only an indirect detecting method, it is impossible to obtain the image input information which is sufficiently reliable.

Various experiments conducted by the inventors revealed that a radiation image suitable for viewing, particularly diagnostic purposes can be obtained (regardless of fluctuation of the radiographic exposure conditions) by conducting in advance a read-out operation for investigating the image input information of a radiation image stored in a stimulable phosphor (hereinafter referred to as the preliminary read-out) by use of a stimulating rays having stimulation energy lower than stimulation energy of a stimulating rays used in a read-out operation for obtaining a visible image for viewing and diagnostic purposes (hereinafter referred to as the final read-out), thereafter conducting the final read-out. In the final read-out, the read-out gain is adjusted, and/or the scale factor is determined, and/or the image processing conditions are determined appropriately based on the image input information obtained by the preliminary read-out. The read-out gain and the scale factor are together referred to as the read-out conditions. Hitherto it was considered to be necessary to detect as much light as possible with a photodetector, as described in U.S. Pat. Nos. 4,258,264 and 4,302,671, and U.S. Pat. No. 4,346,295 (DE-OS No. 2,951,501), since the amount of light emitted from the stimulable phosphor upon stimulation thereof by a stimulating rays is very small even when the stimulable phosphor having the highest sensitivity among those available was selected. In view of these state of arts, since it is beyond the imagination of the skilled in the art to dissipate intentionally the radiation energy stored in the stimulable phosphor for the purpose of only investigating the image input information, the above findings is unexpected.

On the basis of these findings, the inventors proposed in Japanese patent application Nos. 56(1981)-165111, 56(1981)-165112, 56(1981)-165113, 56(1981)-165114 and 56(1981)-165115 a method of and apparatus for reading out a radiation image in which, before conducting the final read-out for obtaining a visible image for viewing and diagnostic purposes, the preliminary read-out is carried out to investigate the image input information of the radiation image stored on the stimulable phosphor sheet by use of a stimulating rays having stimulation energy lower than stimulation energy of a stimulating rays used in the final read-out.

The stimulation energy referred to in this invention means the effective energy of the stimulating rays which the stimulable phosphor sheet receives per unit area.

In the method just described above, the stimulation energy of the stimulating rays applied to the stimulable phosphor in the preliminary read-out should be lower than the stimulation energy of the stimulating rays used in the final read-out. As the ratio of the stimulation energy of the stimulating rays in the preliminary read-out to the stimulation energy of the stimulating rays in the final read-out increases near to 1, the amount of the radiation energy remaining in the stimulable phosphor after the preliminary read-out decreases. It has been found that, when the ratio is smaller than 1, it is possible to obtain a radiation image suitable for viewing and diagnostic purposes by appropriately adjusting the read-out gain. However, in order to obtain a radiation image having an improved image quality, particularly a high diagnostic efficiency and accuracy, the aforesaid ratio should preferably be as small as possible insofar as the image input information of the radiation image stored in the stimulable phosphor can be detected sufficiently to determine the read-out conditions or the image processing conditions, that is, insofar as the light emitted from the stimulable phosphor in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted from the stimulable phosphor in the preliminary read-out.

In order to make the stimulation energy of the stimulating rays in the preliminary read-out smaller than the stimulation energy of the stimulating rays in the final read-out, it is possible to use any known method. For example, the output level of the laser source used in the preliminary read-out may be decreased, the beam diameter of the laser beam may be increased, the scanning speed of the laser beam may be increased, or the moving speed of the stimulable phosphor sheet may be increased.

In the above described method, since the image input condition of a radiation image stored in the stimulable phosphor can be investigated in advance, it is possible to obtain a radiation image having an improved image quality, particularly a high diagnostic efficiency and accuracy regardless of fluctuation of the radiographic exposure conditions by adjusting the read-out gain based on the investigated image input information without using a read-out system having a wide dynamic range. Further, since the image input pattern of the radiation image stored in the stimulable phosphor can be investigated in advance, it is possible to obtain a radiation image having an improved image quality, particularly a high diagnostic efficiency and accuracy by processing the read-out electric signal suitable according to the image input pattern, and/or by optimizing the scale factor. It is also possible to reduce the read-out time by omitting the final read-out for a portion of the stimulable phosphor carrying no image.

In the above-mentioned method, since the radiation energy stored in the stimulable phosphor fades with time, the interval between the preliminary read-out and the final read-out is considered to have to minimized in order to effectively use the image input information obtained in the preliminary read-out for the final read-out. When the difference between the amount of the radiation energy stored at the time of preliminary read-out and that at the time of final read-out is 10% or less, it is possible to obtain a radiation image having a practically sufficient image quality, particularly sufficient diagnostic efficiency and accuracy by detecting the image input information of the radiation image stored in the stimulable phosphor and setting the final read-out conditions and/or the signal processing conditions by use of the detected image input information. Accordingly, it is considered preferable that the preliminary read-out be conducted within one hour before the final read-out is started.

However, it was found that the fading speed of the intensity of light emitted from the stimulable phosphor when the stimulable phosphor is exposed to a stimulating rays having a predetermined intensity generally differs according to the time elapsed after a radiation image is recorded in the stimulable phosphor. Therefore, if the time interval between the radiation image recording and the preliminary read-out varies, it is not always possible to correctly estimate the amount of light emitted from the stimulable phosphor upon stimulation thereof at the time of the final read-out based on the image input information obtained by the preliminary read-out and to select optimal final read-out conditions only by maintaining the time interval between the preliminary read-out and the final read-out constant. FIG. 1 shows the decay characteristics of the amount of light emitted from the stimulable phosphor upon exposure thereof to a stimulating rays having a predetermined intensity with respect to the stimulation time duration. In FIG. 1, the curve A shows the decay characteristics obtained when the exposure of the stimulable phosphor to the stimulating rays is started 30 seconds after a radiation image is recorded therein, the curve B shows the decay characteristics obtained when the exposure thereof is started one hour after the radiation image recording, and the curve C shows the decay characteristics obtained when the exposure is started four hours after the radiation image recording. The vertical axis of the graph indicates an amount of light emission normalized to 100 at the initial values. As shown in FIG. 1, the fading curve obtained by exposing the stimulable phosphor to a stimulating rays having a predetermined intensity changes according to the interval between the radiation image recording and the exposure to the stimulating rays. Accordingly, only by maintaining the interval between the preliminary read-out and the final read-out constant, it is not always possible to correctly estimate the amount of light emitted from the stimulable phosphor upon stimulation thereof at the time of the final read-out based on the integrated value of the light emission amount determined by the preliminary read-out.

SUMMARY OF THE INVENTION

The primary object of the present invention is to provide an improved radiation image read-out method in which a stimulable phosphor sheet carrying a radiation image therein is exposed to a stimulating rays which causes it to emit light in the pattern of the stored image, and the emitted light is read out by a photodetector.

Another object of the present invention is to provide a radiation image read-out method which makes it possible to conduct the final read-out under the optimal read-out conditions and/or optimal image processing based on the image input information obtained by the preliminary read-out.

The specific object of the present invention is to provide a radiation image read-out method which makes it possible to achieve the final read-out under the optimal read-out conditions and/or the image processing under the optimal image processing conditions even when the interval between the radiation image recording and the preliminary read-out changes.

A still further object of the present invention is to provide an apparatus for carrying out above methods.

The above objects are accomplished by measuring the interval between the radiation image recording and the preliminary read-out, correcting the image input information obtained by the preliminary read-out according to the measured interval therebetween, and conducting the final read-out based on the information thus compensated.

In the present invention, since a decay curve of the light emitted from the stimulable phosphor upon stimulation thereof can be correctly investigated by measuring the interval between the recording of a radiation image in the stimulable phosphor and the preliminary read-out, it is possible to correctly estimate the amount of light emitted from the stimulable phosphor upon stimulation thereof at the time of the final read-out based on the image input information obtained by the preliminary read-out, i.e. the integrated amount of light emitted from the stimulable phosphor upon stimulation thereof at the time of the preliminary read-out. Accordingly, it becomes possible to conduct the final read-out and/or the image processing under the optimal conditions even when the interval between the radiation image recording and the preliminary read-out changes.

In the present invention, correction of the image input information obtained by the preliminary read-out can be easily conducted, for example by using a relationship determined experimentally in advance between the interval from the radiation image recording to the preliminary read-out and the decay characteristics of the amount of light emitted from the stimulable phosphor upon stimulation.

In the present invention, the interval between the radiation image recording and the preliminary read-out may be measured, for example, by attaching a bar code label, on which an ID number for identifying the stimulable phosphor sheet is indicated, to the peripheral portion of the stimulable phosphor sheet, storing the point of time (when a radiation image is recorded on the stimulable phosphor sheet carrying the ID number) in a memory means with ID number, and calculating the interval between the radiation image recording and the preliminary read-out by use of the ID number when the preliminary read-out is conducted. Alternatively, the aforesaid interval may be determined by attaching a magnetic recording medium to the stimulable phosphor sheet, recording the point of time when the radiation image is recorded on the stimulable phosphor sheet on the magnetic recording medium, and reading out radiation image recording time recorded on the magnetic recording medium when the preliminary read-out is conducted.

In the present invention, in order to improve the signal-to-noise ratio, it is preferable that the stimulable phosphor emits light having a wavelength range not overlapping upon the range of wavelength of the stimulating rays employed to excite the stimulable phosphor. Preferably, when a laser source which emits stimulating rays having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the read-out time, it is preferable to use a gas ion laser source emitting a laser beam having a wavelength range shorter than 600 nm, such as an $Ar^+$ laser beam (488 nm, 514.5 nm), a Kr+ laser beam (520.9 nm, 530.9 nm, 568.2 nm), or an Ar+—Kr+ laser beam.

As the stimulable phosphor, for example, rare earth element activated alkaline earth metal fluorohalide phosphor is preferred. One example of this phosphor is, as shown in U.S. patent application Ser. No. 57,080, now abandoned, (DE-OS No. 29 28 245), a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaO.xAl_2O_3:Eu$ wherein $0.8 \leq X \leq 10$; and $M^{II}O.xSiO_2:A$ wherein $M^{II}$ is Mg, Ca, Sr, Zn, Cd or Ba, A is Ce, Tb, Eu, Tm, Pb, Tl, Bi or Mn, and x is number satisfying $0.5 \leq X \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined patent publication Nos. 56(1981)-2385 and 56(1981)-2386, or barium fluorohalide phosphors added with at least one of a metal chloride, a metal bromide and a metal iodide as disclosed in U.S. patent application Ser. No. 367,665 (European patent publication No. 29,963) are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No.4,394,581 (European patent publication No. 21,174).

As for the signal processing, it is possible to employ a frequency processing as disclosed in U.S. Pat. No. 4,315,318, U.S. Pat. No. 4,346,295 (DE-OS No. 29 51 501) and 4,387,428 (European patent publication No. 31,952), Japanese Unexamined patent publication Nos. 56(1981)-75137, 56(1981)-75139 and 56(1981)-75141, and a gradation processing as disclosed in U.S. Pat. Nos. 4,302,672, 4,276,473 or 4,310,886.

BRIEF DESCRIPTION OF THE DRAWINGS

FIG. 3 is a schematic view showing the whole system of the radiation image recording system in which another embodiment of the radiation image read-out method in accordance with the present invention is employed.

DESCRIPTION OF THE PREFERRED EMBODIMENTS

The present invention will hereinbelow be described in further detail with reference to the accompanying drawings.

Figure 2:
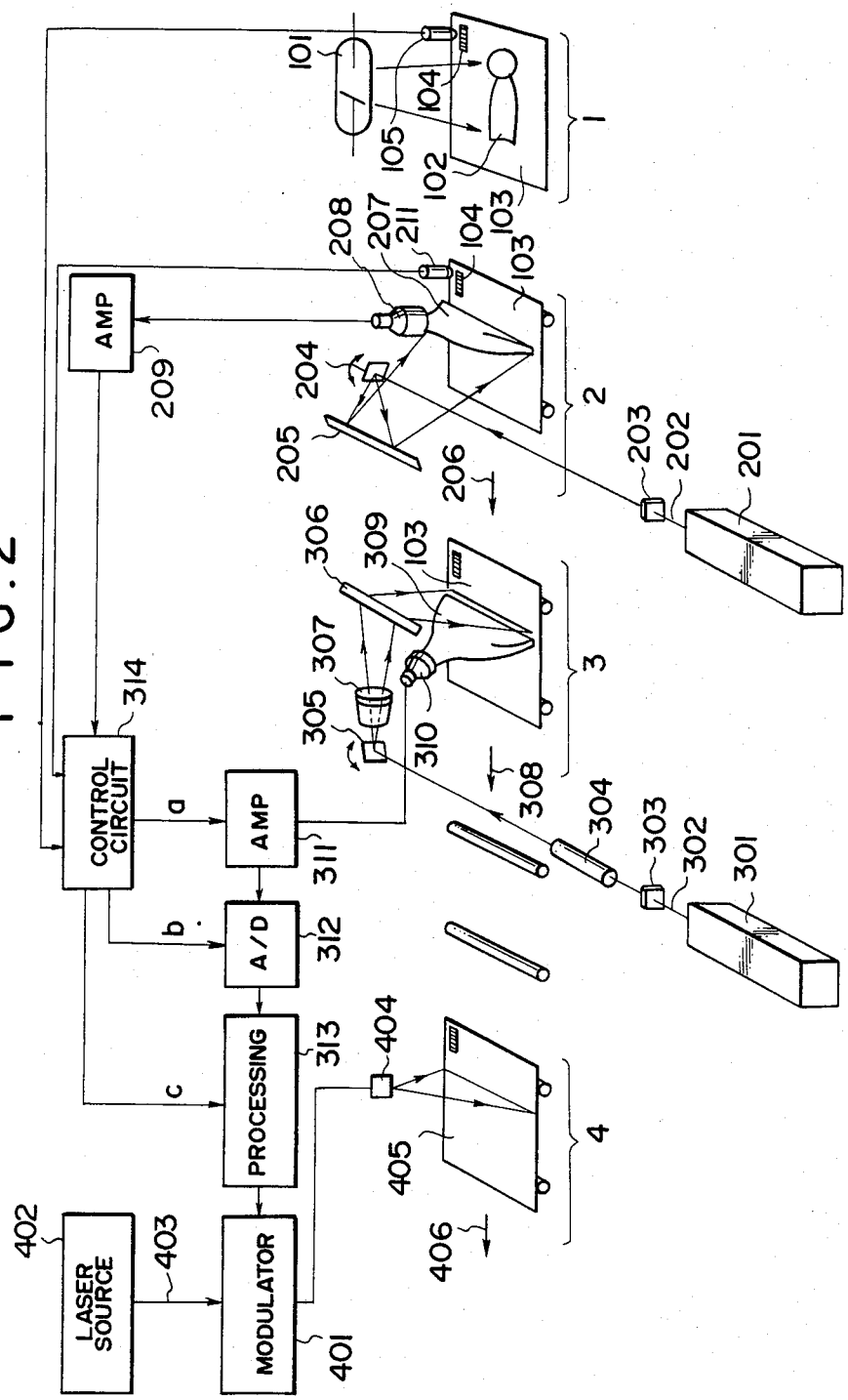
FIG. 2 is a schematic view showing the whole system of the radiation image recording system in which an embodiment of the radiation image read-out method in accordance with the present invention is employed.

FIG. 2 schematically shows a radiation image recording system in which an embodiment of the radiation image read-out method in accordance with the present invention is employed, and which comprises a recording section 1, a preliminary read-out section 2, a final read-out section 3 and image reproducing section 4.

In the recording section 1, X-rays emitted from an X-rays source 101 pass through an object 102 and are absorbed into a stimulable phosphor sheet 103 to have an X-rays image of the object 102 stored thereon. To an edge portion of the phosphor sheet 103 is attached a bar code label 104 on which an ID number is recorded. When a radiation image is recorded on the phosphor sheet 103, the ID number recorded on the bar code label 104 is read by a bar code reader 105. The signal of the ID number thus read is sent to a control circuit 314 for storing the ID number with reference to the point of time when the radiation image is recorded on the phosphor sheet 103. The phosphor sheet 103 carrying the X-rays image stored therein is then sent to the preliminary read-out section 2.

In the preliminary read-out section 2, a laser beam 202 emitted from a laser source 201 is first passed through a filter 203 for cutting off the light beam having a wavelength within a range identical with the range of the wavelength of the light emitted from a stimulable phosphor sheet 103 upon stimulation by the laser beam 202. Then, the laser beam 202 is one-dimensionally deflected by a light deflector 204 such as galvanometer mirror and directed onto the stimulable phosphor sheet 103 by a plane reflection mirror 205. While the laser beam 202 impinges upon the stimulable phosphor sheet 103, the phosphor sheet 103 is moved in the direction of the arrow 206 (subsidiary scanning direction) and, consequently, the whole area of the phosphor sheet 103 is exposed to and scanned with the laser beam 202. The power of the laser source 201, the beam diameter of the laser beam 202, the scanning speed of the laser beam 202, and the moving speed of the phosphor sheet 103 are selected so that the stimulation energy of the laser beam 202 for preliminary read out is smaller than the stimulation energy of the laser beam for final read out. When exposed to the laser beam 202, the stimulable phosphor sheet 103 emits light in proportion to the X-rays energy stored therein, and the emitted light enters a light guiding sheet 207. The light guiding sheet 207 has a linear light input face positioned close to the scanning line on the stimulable phosphor sheet 103, and a ring-shaped light output face in close contact with the light receiving face of a photodetector 208, which may be a photomultiplier. The light guiding sheet 207 is formed of a transparent thermoplastic resin sheet such as an acrylic resin sheet so that the light entering from the light input face can be effectively transmitted to the light output face by total reflection through the interior of the light guiding sheet 207. The light emitted from the stimulable phosphor sheet 103 upon stimulation thereof is guided in the interior of the light guiding sheet 207, emitted from the light output face of the light guiding sheet 207 and received by the photodetector 208. The light guiding sheet 207 may be of a shape and a material as disclosed in U.S. Pat. No. 4,346,295 or U.S. Pat. No. 4,368,384 (European patent publication No. 32,521).

The light receiving face of the photodetector 208 is provided with a filter for transmitting only the light having the wavelength distribution of the light emitted from the stimulable phosphor sheet 103 and cutting off the light having the wavelength distribution of the stimulating rays, so that the photodetector 208 can detect only the light emitted from the stimulable phosphor sheet 103 upon stimulation thereof. The output of the photodetector 208 is amplified by an amplifier 209 and sent to the control circuit 314 of the final read-out section 3.

Figure 1:
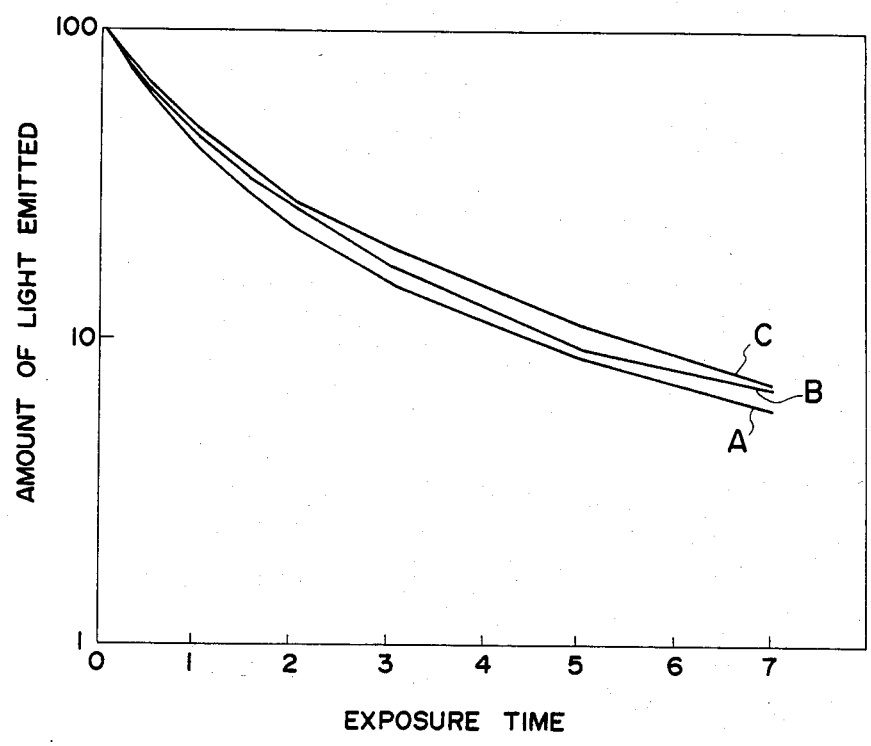
FIG. 1 is a graph showing the fading speed of the amount of light emitted from the stimulable phosphor upon exposure thereof to a stimulating rays having a predetermined intensity.

In the preliminary read-out, the ID number recorded on the bar code label 104 attached to the stimulable phosphor sheet 103 is read out by the bar code reader 211, and the signal is sent to the control circuit 314. The control circuit 314 stores the point of time when the preliminary read-out is conducted with reference to the ID number signal, searches the data of the point of time when the radiation image recording was conducted on the phosphor sheet 103, i.e. the phosphor sheet carrying the same ID number as that subjected to the preliminary read-out, and calculates the interval between the radiation image recording and the preliminary read-out of the phosphor sheet 103. On the basis of the calculated interval (i.e. based on the fading characteristics as shown in FIG. 1), the image input information sent from the amplifier 209 is corrected. On the basis of the image input information thus corrected, the control circuit 314 generates an amplification degree setting value (a), a scale factor setting value (b) and an image processing condition setting value (c). When the preliminary read-out is finished as described above, the stimulable phosphor sheet 103 is sent to the final read-out seciton 3.

In the final read-out section 3, a laser beam 302 emitted from a laser source 301 is first passed through a filter 303 for cutting off the light beam having a wavelength within the range identical with the range of the wavelength of the light emitted from the stimulable phosphor sheet 103 upon stimulation by the laser beam 302. Then, the beam diameter of the laser beam 302 is strictly adjusted by a beam expander 304. The laser beam 302 is then deflected by a light deflector 305 formed of a galvanometer mirror or the like, and directed onto the stimulable phosphor sheet 103 by a plane reflection mirror 306. Between the light deflector 305 and the plane reflection mirror 306 is positioned an $f\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the phosphor sheet 103 is moved in the direction of the arrow 308 (subsidiary scanning direction) and, consequently, the whole area of the phosphor sheet 103 is exposed to and scanned with the laser beam 302. Upon exposure to the laser beam 302, the stimulable phosphor sheet 103 emits light in proportion to the X-rays energy stored therein, and the light emitted enters a light guiding sheet 309 which is made of the same material and has the same construction as the light guiding sheet 207 used for preliminary read-out. The light emitted from the stimulable phosphor sheet 103 is guided in the interior of the light guiding sheet 309 through total reflection, emitted from the light output face of the light guiding sheet 309 and received by a photodetector 310.

The light receiving face of the photodetector 310 is closely contacted with a filter for selectively transmitting only the light having the wavelength distribution of the light emitted from the stimulable phosphor sheet 103, so that the photodetector 310 can detect only the light emitted therefrom. The light emitted from the phosphor sheet 103 and detected by the photodetector 310 in the final read-out is converted to an electric signal, amplified to an appropriate level by an amplifier 311 the sensitivity of which has been set by the amplification degree setting value (a), and then inputted into an A/D converter 312. In the A/D converter 312, the electric signal is converted to a digital signal with a scale factor which has been set by the scale factor setting value (b) to suit the signal fluctuation level. The digital signal thus obtained is inputted into a signal processing circuit 313, in which it is processed based on the image processing condition setting value (c) so as to obtain an X-rays image suitable for viewing and diagnostic purposes. The electric image signal obtained from the signal processing circuit 313 is sent to a light modulator 401 at the image reproducing section 4.

In the image reproducing section 4, a laser beam 403 emitted from a recording laser source 402 is modulated by the light modulator 401 based on the electric image signal sent from the signal processing circuit 313, and directed onto a light-sensitive material 405 such as a photographic film by a scanning mirror 404 for scanning the light-sensitive material 405 with the laser beam 403. At this time, the light-sensitive material 405 is moved perpendicularly to the scanning direction, i.e. in the direction of the arrow 406. Accordingly, the X-rays image is reproduced on the light sensitive material 405.

FIG. 3 schematically shows a radiation image recording system in which another embodiment of the radiation image read-out method in accordance with the present invention is employed. In FIG. 3, similar elements are numbered with the same reference numerals with respect to FIG. 2. The embodiment shown in FIG. 3 is similar to that shown in FIG. 2, except that a magnetic recording medium 106 is attached to an edge portion of the stimulable phosphor sheet 103, the time when radiation image recording is conducted is recorded on the magnetic recording medium 106 by a magnetic head 107 positioned at the recording section 1 at the time of the radiation image recording, and the recorded time is read out from the magnetic recording medium 106 by a magnetic head 212 positioned at the preliminary read-out section 2 when the preliminary read-out is conducted. The recording and read-out of the point of time when the radiation image recording is conducted may be carried out in synchronization with the feeding or taking out of the phosphor sheet 103 from the recording section 1 and the preliminary read-out section 2, or by moving the magnetic heads 107 and 212.

In the embodiment shown in FIG. 3, since the time when the radiation image recording is conducted is recorded on the magnetic recording medium 106, it is not necessary to employ a control unit comprising a memory, and it becomes possible to omit the procedure for searching the ID number.

It should be understood that the present invention can be embodied in various ways other than the above described embodiments. For instance, the magnetic recording medium 106 shown in FIG. 3 may be replaced by a semiconductor memory, an optical recording means, or the like. Further, it is also possible to employ a single read-out apparatus for conducting both preliminary read-out and final read-out by changing the scanning conditions of the simulating rays, and the like.

Further, instead of directly reproducing and recording the X-rays image by use of the laser source 402 at the image reproducing section 4, the final signal obtained at the final read-out section 3 may be displayed on a display unit such as a CRT, or the final radiation image displayed on a CRT or the like may be recorded by use of a video tape recorder or a printer. Alternatively, the radiation image may be recorded on a thermosensitive recording material by use of heat wave, or may be recorded by any other known recording methods such as an electrophotographic method.

It is also possible to replace the laser sources 201 and 301 for emitting the stimulating rays by LED arrays having a wavelength range different from that of light emitted from the stimulable phosphor sheet upon stimulation thereof. In this case, the light deflectors 204 and 305 may be omitted.

Futhermore, instead of the photodetectors 208 and 310 provided with the light guiding sheets 207 and 309 respectively, a plurality of photomultipliers or phototransistors may be positioned along a straight line in the main scanning direction. It is also possible to expose the whole surface of the stimulable phosphor sheet to light at a time, and employ a photodetector capable of two-dimensionally detecting light, for example, a television camera, or the like.

We claim:

1. In a radiation image read-out method in which a stimulable phosphor sheet carrying a radiation image stored thereon is exposed to a stimulating ray which causes the stimulable phosphor sheet to emit light in the pattern of the stored image, and the emitted light is photoelectrically read out, the radiation image read-out method comprising: conducting a preliminary read-out by exposing the stimulable phosphor sheet to the stimulating ray having stimulation energy lower than stimulation energy of a stimulating ray used in a final read-out, measuring the interval between the radiation image recording on the stimulable phosphor sheet and the preliminary read-out, determining decay characteristics of light emitted from the stimulable phosphor sheet upon exposure thereof based on said interval measured, correcting the image input information detected by said preliminary read-out according to said decay characteristics determined, setting the final read-out conditions and/or the image processing conditions based on the corrected image input information, and conducting the final read-out.

2. A method as defined in Claim 1 wherein said interval is measured by attaching a bar code label for indicating an identification number of the stimulable phosphor sheet to a peripheral portion of the stimulable phosphor sheet, storing the time when said radiation image recording is conducted in a memory means, and calculating said interval by use of said identification number when said preliminary read-out is conducted.

3. A method as defined in Claim 1 wherein said interval is measured by attaching a magnetic recording medium to a peripheral portion of the stimulable phosphor sheet, recording the time when said radiation image recording is conducted on said magnetic recording medium, and reading out said time when said preliminary read-out is conducted.

4. A method as defined in Claim 1 wherein said preliminary read-out and said final read-out are conducted by scanning the stimulable phosphor sheet with respective stimulating rays.

5. A method as defined in Claim 4 wherein the scanning speed in said preliminary read-out is higher than the scanning speed in said final read-out.

6. A method as defined in Claim 4 wherein the beam diameter of the stimulating ray in said preliminary read-out is larger than the beam diameter of the stimulating ray in said final read-out.

7. A radiation image read-out apparatus including a stimulating ray emitting means for emitting a stimulating ray to a stimulable phosphor sheet carrying a radiation image stored therein, a means for moving said stimulable phosphor sheet, and a light detecting means for photoelectrically reading out light emitted from said stimulable phosphor sheet in the pattern of the radiation image stored therein upon exposure thereof to said stimulating ray, wherein the improvement comprises the provision of means, prior to emission of the stimulating ray for final read-out by said stimulating ray emitting means, emitting a stimulating ray for preliminary read-out having stimulation energy lower than stimulation energy of said stimulating ray for final read-out to said stimulable phosphor sheet, means for measuring an interval between the radiation image recording on the stimulable phosphor sheet and the preliminary read-out, means for correcting an image input information detected by said preliminary read-out based on said interval measured, and means for setting the final read-out conditions and/or the image processing conditions based on the corrected image input information.

* * * * *